United States Patent
Ross et al.

(10) Patent No.: US 10,746,917 B2
(45) Date of Patent: Aug. 18, 2020

(54) SUSPENDED PENDANT LIGHTGUIDE LUMINAIRE WITH SOUND DAMPENING

(71) Applicant: Eaton Intelligent Power Limited, Dublin (IE)

(72) Inventors: Alexander James Ross, Aurora, CO (US); Sohana Arni, Aurora, CO (US); Travis Boyle, Denver, CO (US); Christopher Joseph Pahl, Denver, CO (US)

(73) Assignee: Signify Holding B.V., Eindhoven (NL)

( * ) Notice: Subject to any disclaimer, the term of this patent is extended or adjusted under 35 U.S.C. 154(b) by 0 days.

(21) Appl. No.: 16/405,843

(22) Filed: May 7, 2019

(65) Prior Publication Data

US 2019/0339443 A1 Nov. 7, 2019

Related U.S. Application Data

(60) Provisional application No. 62/668,110, filed on May 7, 2018.

(51) Int. Cl.

| | |
|---|---|
| *F21S 8/04* | (2006.01) |
| *F21V 8/00* | (2006.01) |
| *F21V 23/00* | (2015.01) |
| *F21V 23/02* | (2006.01) |
| *F21S 8/06* | (2006.01) |

(52) U.S. Cl.
CPC .......... *G02B 6/0073* (2013.01); *F21V 23/002* (2013.01); *F21V 23/004* (2013.01); *F21V 23/023* (2013.01); *F21S 8/04* (2013.01); *F21S 8/06* (2013.01); *F21S 8/061* (2013.01)

(58) Field of Classification Search
CPC ...... F21S 8/026; F21S 8/04; F21S 8/06; F21S 8/061; F21S 8/063; F21S 8/068; F21V 21/02; F21V 21/03; F21V 21/10; F21V 21/104; F21V 21/112; G02B 6/0073; G02B 6/0011; E04B 1/99
See application file for complete search history.

(56) References Cited

U.S. PATENT DOCUMENTS

| | | |
|---|---|---|
| D221,181 S | 7/1971 | Bobrick |
| D267,900 S | 2/1983 | Ishii |
| 6,296,372 B1 * | 10/2001 | Rhomberg ............... F21S 8/06 362/217.07 |

(Continued)

FOREIGN PATENT DOCUMENTS

| | | |
|---|---|---|
| DE | 102008026504 | 12/2009 |
| DE | 102015101480 | 8/2016 |

(Continued)

OTHER PUBLICATIONS

Lightart.com; I/O LightArt Brochure; Aug. 2017.

(Continued)

*Primary Examiner* — Zheng Song
(74) *Attorney, Agent, or Firm* — King & Spalding LLP

(57) ABSTRACT

A luminaire includes a frame having a lightguide and at least one light emitting diode disposed to direct light into an edge of the lightguide. A low voltage power cable delivers power to the at least one light emitting diode. A plurality of suspension cables are attached to the frame for suspending the luminaire. At least one acoustic panel is attached to the frame.

17 Claims, 16 Drawing Sheets

(56) References Cited

U.S. PATENT DOCUMENTS

| | | | |
|---|---|---|---|
| D459,525 S | 6/2002 | Barry | |
| D469,562 S | 1/2003 | Crasset | |
| D547,483 S | 7/2007 | Pickett | |
| D633,645 S | 3/2011 | Verelst | |
| 8,714,775 B2* | 5/2014 | Bracher | F21S 8/061 362/249.01 |
| 9,835,300 B2* | 12/2017 | Feit | F21S 8/061 |
| D814,691 S | 4/2018 | Clark | |
| 2012/0137550 A1* | 6/2012 | Stafford | G09F 7/18 40/541 |
| 2012/0257383 A1* | 10/2012 | Zhang | F21V 15/015 362/235 |
| 2013/0027927 A1* | 1/2013 | Wegger | F21S 8/06 362/235 |
| 2014/0211457 A1 | 7/2014 | Tarsa | |
| 2014/0268766 A1* | 9/2014 | Lu | F21V 21/30 362/249.1 |
| 2015/0277030 A1* | 10/2015 | Huang | F21V 3/04 362/611 |
| 2015/0300605 A1 | 10/2015 | Clark | |
| 2015/0338038 A1* | 11/2015 | Feit | F21V 19/0045 362/147 |
| 2016/0372100 A1* | 12/2016 | Mason | F21V 33/006 |
| 2018/0039014 A1 | 2/2018 | Ju et al. | |
| 2018/0195683 A1* | 7/2018 | Sonneman | F21V 5/04 |
| 2018/0274769 A1* | 9/2018 | Vavruskova | F21S 8/061 |
| 2018/0334804 A1 | 11/2018 | Patterson | |
| 2019/0017260 A1* | 1/2019 | Bou Harb | E04B 1/86 |
| 2019/0064426 A1* | 2/2019 | Ju | F21S 2/00 |
| 2019/0088241 A1* | 3/2019 | Czech | G10K 11/162 |
| 2019/0339443 A1 | 11/2019 | Ross | |

FOREIGN PATENT DOCUMENTS

| | | |
|---|---|---|
| EP | 2573461 | 3/2013 |
| EP | 2653775 | 10/2013 |
| EP | 2765354 | 8/2014 |

OTHER PUBLICATIONS

Accoustic Solutions. https://www.focalpointlights.com/acousticsolutions Retrieved Jun. 20, 2019. pp. 1-6.
Boxhaped Pendants in photo accompanying Interiors and Sources article titled 'Acoustic Lighting Offers Defense Against Noise Pollution' by Rachel Kats Nov. 6, 2018. From <https://www.interiorsandsources.com/article-details/articleid/22386/title/lightart-merges-acoustics-lighting>. (Year: 2018).
Vapor Echo Rectilinear by Luxxbox. Spec Sheet © Sep. 2019 from luxxbox.com. (Year: 2019).
International Search Report for PCT/EP2019/025140, dated Jul. 1, 2019.

* cited by examiner

SUSPENDED PENDANT LIGHTGUIDE LUMINAIRE WITH SOUND DAMPENING

RELATED APPLICATIONS

The present application claims priority to U.S. Provisional Patent Application No. 62/668,110 filed May 7, 2018 and titled "Suspended Pendant Lightguide Luminaire With Sound Dampening," the entire content of which is incorporated herein by reference.

TECHNICAL FIELD

Embodiments of the technology relate generally to illumination systems and more particularly to suspended lightguide luminaires that provides sound dampening.

BACKGROUND

As compared to incandescent and fluorescent light sources, light emitting diodes (LEDs) offer substantial potential benefit associated with their energy efficiency, light quality, and compact size. However, applying LEDs for use in lighting systems offers both challenges and opportunities. As one example, LEDs can be used in edge-lit solutions where light from the LEDs is directed into a panel of optical material in order to distribute the light for illuminating an area. These types of edge-lit lighting systems provide a variety of opportunities for illuminating an area and for offering other features and benefits.

SUMMARY

In one example embodiment, the present disclosure provides a luminaire comprising a frame having at least one outer side and at least one light emitting diode mounted to the frame. A lightguide is disposed within the frame, the lightguide comprising a top surface, a bottom surface, and an edge surface, the edge surface configured to receive light from the at least one LED. The luminaire further comprises a plurality of suspension cables attached to the frame and configured to suspend the luminaire. A low voltage power cable provides power to the at least one LED from a power supply. The luminaire further comprises at least one acoustic panel coupled to the frame.

In another example embodiment, the present disclosure provides a luminaire comprising a frame having at least one outer side and at least one light emitting diode mounted to the frame. A lightguide is disposed within the frame, the lightguide comprising a top surface, a bottom surface, and an edge surface, the edge surface configured to receive light from the at least one LED. The luminaire further comprises a plurality of suspension cables attached to the frame and configured to suspend the luminaire. The plurality of suspension cables comprise a low voltage power cable that provides power to the at least one LED from a power supply. The luminaire further comprises at least one acoustic panel coupled to the frame.

These and other aspects and embodiments will be apparent from the following disclosure and claims and the appended drawings.

BRIEF DESCRIPTION OF THE FIGURES

Reference will be made below to the accompanying drawings.

Figure 1:
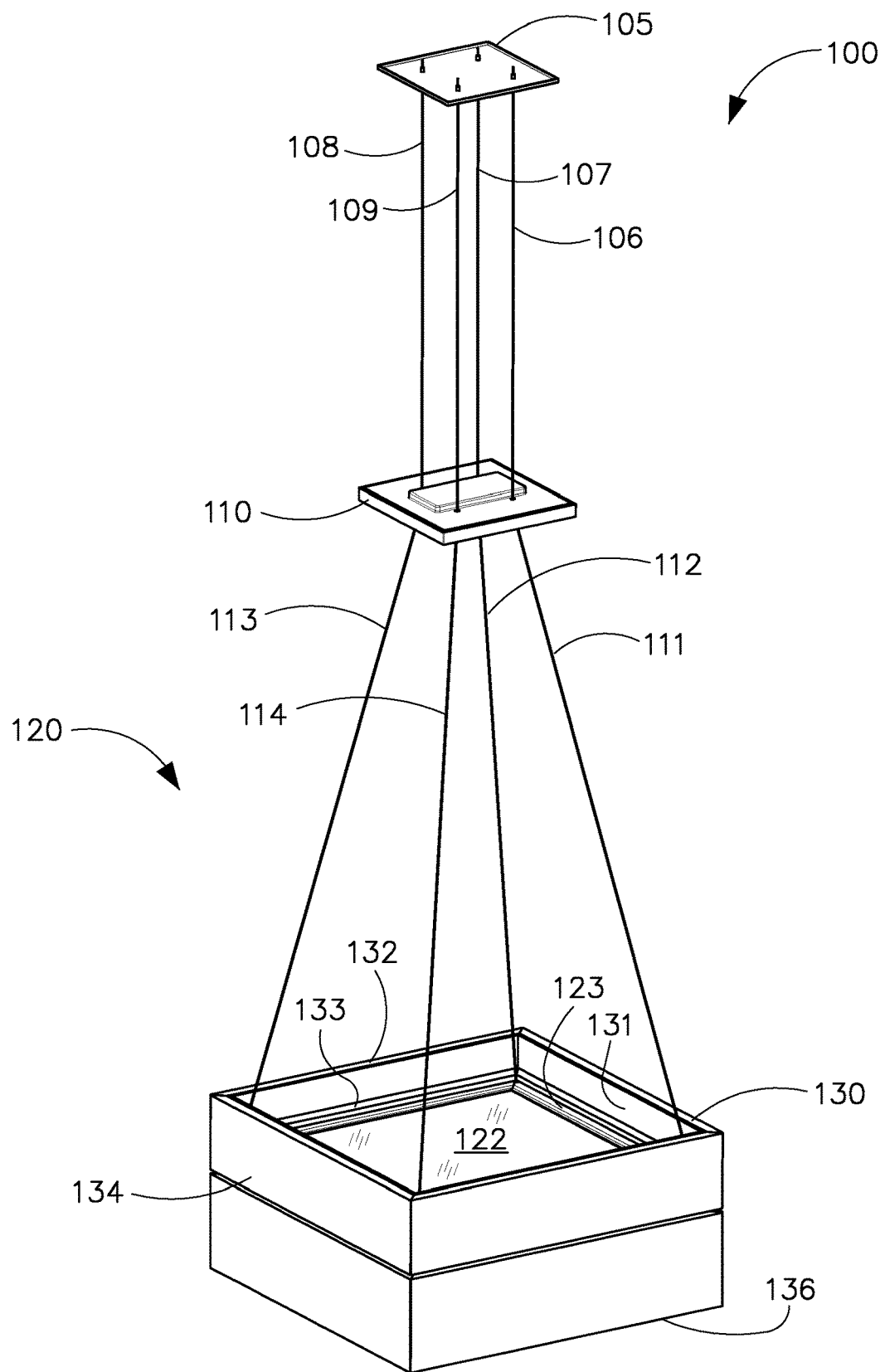
FIG. 1 is a top perspective view of a suspended luminaire in accordance with an example embodiment of the disclosure.

The drawings illustrate only example embodiments and are therefore not to be considered limiting of the embodiments described, as other equally effective embodiments are within the scope of this disclosure. The elements and features shown in the drawings are not necessarily drawn to scale, emphasis instead being placed upon clearly illustrating principles of the embodiments. Additionally, certain dimensions or positions may be exaggerated to help visually convey certain principles. In the drawings, similar reference numerals among different figures designate like or corresponding, but not necessarily identical, elements.

DETAILED DESCRIPTION OF EXAMPLE EMBODIMENTS

The example luminaires described herein use a lightguide in a luminaire that is suspended from a ceiling or other mounting structure. As will be further described, the example luminaires described herein provide additional benefits. As one example, the lightguide can be oriented in the luminaire so that when the LEDs are powered on, the lightguide provides illumination light from the LEDs to an area. Furthermore, the lightguide is oriented so that when the LEDs are powered off, the lightguide permits ambient light to pass through the lightguide and illuminate an area.

Another example benefit is that the luminaire can comprise one or more acoustic panels or features used for absorbing sound. Common open-office spaces and other volumes of space often lack mechanical features such as ceilings and walls that improve acoustic properties for occupants. Acoustic baffles and panels can be added to walls and ceilings, but the associated costs can run quite high. In addition, such acoustic baffles and panels are often not aesthetically pleasing. Luminaires provide a unique opportunity for attaching or incorporating acoustic baffles thereby eliminating the need to add acoustic baffles to walls and ceilings.

The example luminaires described in this disclosure use a lightguide for transmitting light. A lightguide can comprise a panel, slab, plate, or related form that can be flat or curved and that comprises two major faces that are internally reflective. Light can be introduced into the lightguide from a first edge of the lightguide, so that the major faces guide the light towards a second edge. One or both of the major faces can have features that provide a controlled release of light flowing through the lightguide, to illuminate an area. Light can thus propagate in the lightguide via internal reflection from the two major faces, traveling from the light-source edge towards an opposing edge, and illumination light can escape from the lightguide through the major faces. A light source, such as one or more light emitting diodes (LEDs), can be positioned adjacent the first edge of the lightguide, so that the light source emits light into the lightguide via the first edge. In alternative embodiments, additional LEDs can be located adjacent to one or more of the other edges of the lightguide thereby directing light into the lightguide from the other edges. In yet other alternative embodiments, instead of positioning LEDs adjacent to the edges of the lightguide, certain edges can have a reflector located adjacent to one or more edges of the lightguide, the reflector reflecting light exiting the edge of the lightguide back into the edge of the lightguide. In yet other alternative embodiments, certain edges can have a diffuser located adjacent to one or more edges of the lightguide, the diffuser acting to diffuse light as it exits the edge of the lightguide. LEDs are an example of the light source that can be used with the lightguide, including but not limited to discrete LEDs, arrays of LEDs, and chip-on-board LEDs. In other embodiments, alternative light sources such as organic LEDs can be used.

The example embodiments described herein can be used with any type of luminaire. While the examples illustrated in the accompanying figures are suspended luminaires, in alternate embodiments, the luminaire can be a linear light fixture, a surface mounted fixture, a troffer, an under cabinet light fixture, a table lamp, a floodlight, a spot light, an architectural light, or a high-bay fixture, as other examples. Example embodiments can be used with new luminaires or retrofitted to existing luminaires. Further, luminaires with which example embodiments can be used can be located in any environment (e.g., indoor, outdoor, high humidity, low temperature, sterile, high vibration).

Figure 2:
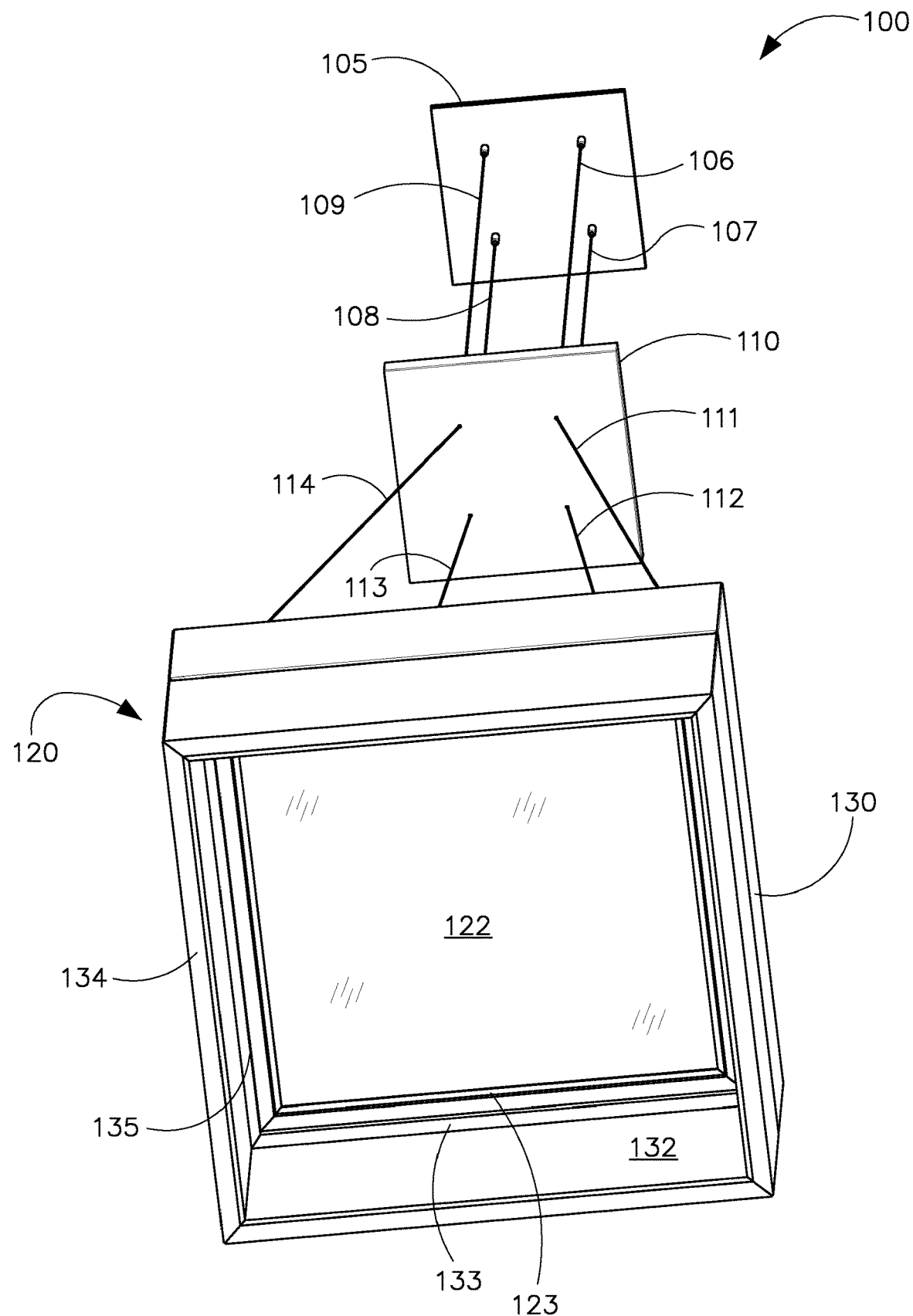
FIG. 2 is a bottom perspective view of the suspended luminaire in accordance with an example embodiment of the disclosure.

Referring now to FIGS. 1 and 2, an example suspended luminaire 100 is illustrated. The suspended luminaire 100 comprises a mounting plate 105 and a light module 120. The mounting plate 105 can be attached to a ceiling, a beam, or other support structure. One or more cables suspend the light module 120 from the mounting plate 105. The one or more cables can also be used to provide power to the one or more LEDs used in the suspended luminaire 100.

In one example, a power supply, such as a driver, a ballast, a transformer, or a rectifier, can be located on or proximate to the mounting plate 105. As examples, the power supply can be attached to one side of the mounting plate 105 or the power supply can be located within a plenum space behind the ceiling to which the mounting plate 105 is attached. The power supply can comprise class 1 connections for receiving power from a power source, such as the electrical power grid or a renewable power source. The power supply can modify the power received from the power source and can comprise low voltage connections for coupling to the cables of the suspended luminaire. The cables can deliver the low voltage power from the power supply to the one or more LEDs.

In the example illustrated in FIGS. 1 and 2, an optional intermediate plate 110 is located between the mounting plate 105 and the light module 120. The optional intermediate plate 110 can be attached to the mounting plate 105 by a series of cables 106, 107, 108, and 109. Additionally, the light module 120 can be attached to the intermediate plate 110 by a series of cables 111, 112, 113, and 114. It should be understood that in alternate embodiments, fewer or more cables can be used. In the example of FIGS. 1 and 2, the power supply can be located at the intermediate plate 110 and the power supply can deliver low voltage power to the light module 120 via one or more of the cables 111, 112, 113, and 114. The power supply can receive power, for example class 1 power, from a power source via a power supply cable. Although not shown in FIGS. 1 and 2, the power supply cable can extend from a mounting surface, such as a ceiling to the power supply at the intermediate plate 110.

FIGS. 1 and 2 also illustrate certain components of the light module 120. The light module comprises a lightguide 122 surrounded by a frame 123. The frame 123 is attached to one or more acoustic panels. The one or more acoustic panels can serve as a shade for directing light from the light module 120. The one or more acoustic panels can also absorb sound which can be beneficial in large open areas or areas with significant noise. The acoustic panels can be made from one or more of a variety of materials known to be effective for absorbing sound such as foam, cork, felt, various polymers such as polyethylene terephthalate, or other porous materials. The acoustic panels can comprise multiple layers of differing materials and the layers can be joined by any one of a variety of means including adhesives, fasteners, or thermoforming processes. The inner, outer, or both the inner and outer surfaces of the acoustic panels also can have three-dimensional patterns or features (e.g. ribs, protrusions, textures) that can increase the acoustic panels effectiveness at absorbing sound. In the example shown in FIGS. 1 and 2, the panels are rectangular, but in alternate embodiments they can have other shapes. Additionally, in example luminaire 100 in FIGS. 1 and 2, the acoustic panels are mounted to the frame so that the lightguide forms a 90 degree angle with each acoustic panel. However, in alternate embodiments, such as the example illustrated in FIG. 16 and described below, the acoustic panels can be mounted to the frame so that they form an angle other than 90 degrees with the lightguide.

In the example suspended luminaire 100 of FIGS. 1 and 2, there are four acoustic panels 130, 132, 134, and 136 because the lightguide 122 and frame 123 have a square shape. However, in other example embodiments, the perimeter of the lightguide and the surrounding frame can have other shapes, including a circle, a triangle, a rectangle, a pentagon, etc. and the number of acoustic panels will be determined by that shape. Additionally, in other embodiments, different numbers and arrangements of panels can be employed. For example, although example luminaire 100 comprises multiple panels, in other embodiments a single acoustic panel can be attached to the frame and the single acoustic panel may surround all of the frame of the luminaire.

Figure 3:
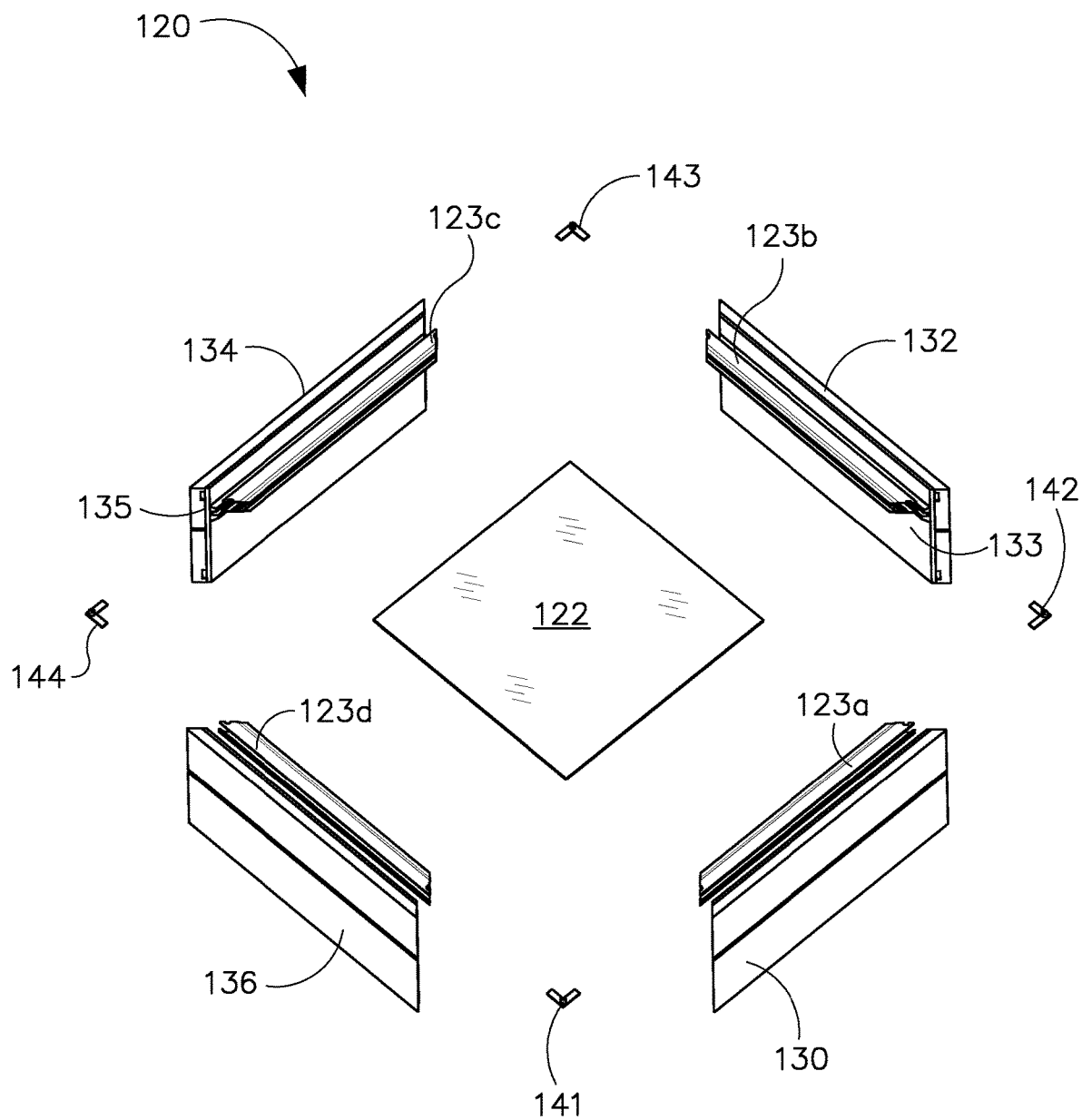
FIG. 3 is an exploded partial view of the suspended luminaire in accordance with an example embodiment of the disclosure.
Figure 4:
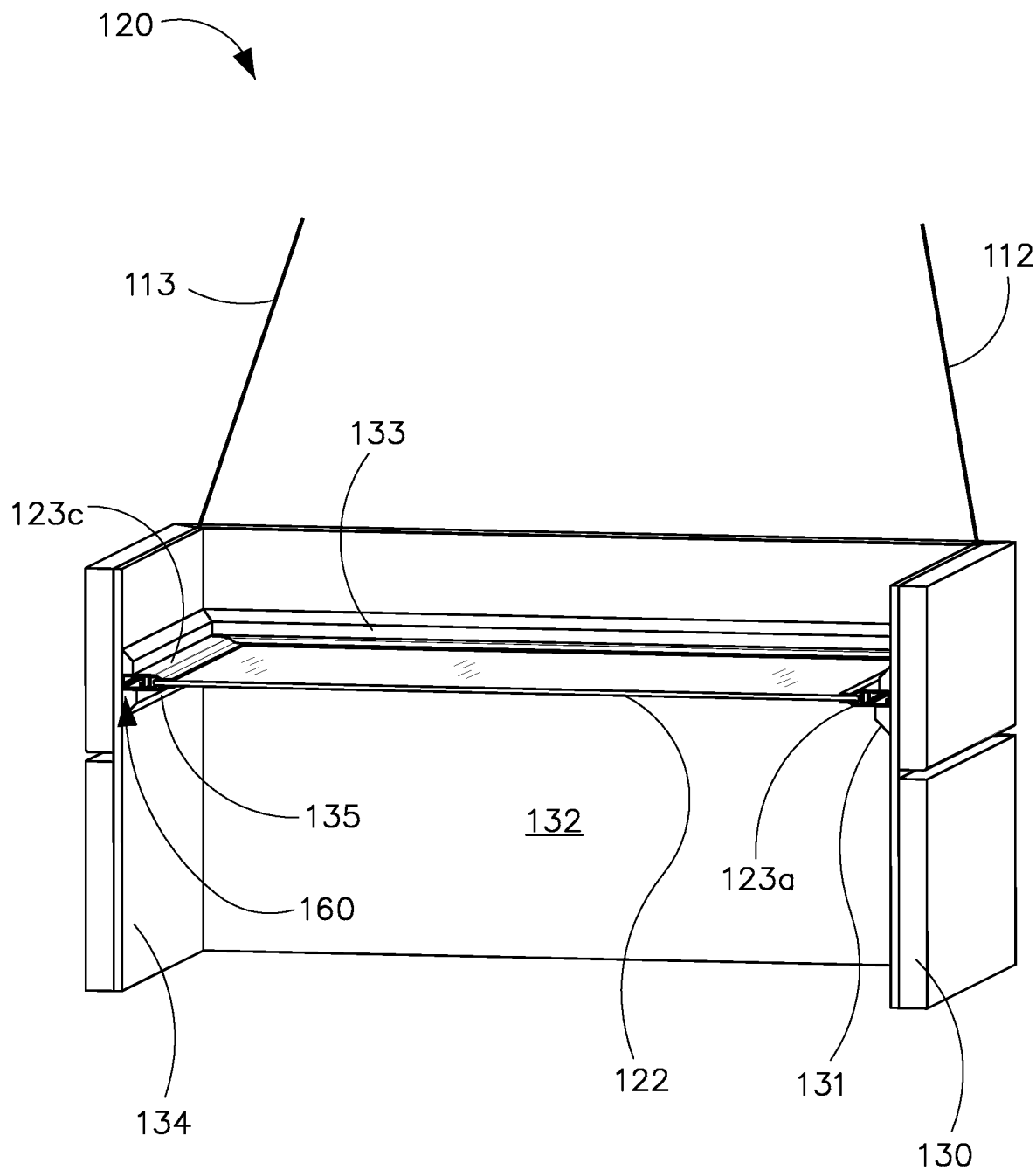
FIG. 4 is a cross-sectional partial view of the suspended luminaire in accordance with an example embodiment of the disclosure.

Additional features of the light module 120 are shown in FIGS. 3 and 4. FIG. 3 shows an exploded view of the light module 120 and FIG. 4 shows a cross-sectional view of the light module 120. The frame 123 can comprise four frame segments 123a, 123b, 123c, and 123d wherein each frame segment is attached to adjacent frame segments by connectors 141, 142, 143, and 144. Disposed within the frame 123 along at least one edge of the lightguide 122 are one or more LEDs 160. The one or more LEDs 160 can be mounted on a circuit board within the frame 123. As described above, in certain embodiments of the suspended luminaire, one or more LEDs 160 are located only along one edge of the lightguide 122. A reflector can be located along the other edges of the lightguide 122 to redirect light back into the other edges of the lightguide 122. In alternate embodiments, there can be a circuit board with one or more LEDs located adjacent to more than one edge of the lightguide 122. The cables 111, 112, 113, and 114 attach to the frame 123 to suspend the light module 120. One or more of the cables 111, 112, 113, and 114 that provide power to light module 120 can be electrically coupled to the one or more circuit boards within the frame 123 in order to deliver power to the LEDs. In certain example embodiments, the frame 123 can be made of a material that does not conduct electricity such as a plastic.

The acoustic panels 130, 132, 134, and 136 each comprise a respective coupling feature 131, 133, 135, and 137 for attaching the acoustic panels to the frame 123. The coupling features 131, 133, 135, and 137 of the example shown in FIGS. 3 and 4 comprise a recess located between an upper and a lower protrusion, each recess configured to receive and secure one side of the frame 123. Each side of the frame 123 can be secured in each respective recess by a friction fit, by locking tabs, or by other fastening means known to those in this field. Each acoustic panel 130, 132, 134, and 136 comprises mitered side edges to facilitate joining each acoustic panel with adjacent acoustic panels. The side edges of each acoustic panel can also comprise magnets or other attaching means for joining the side edge of each acoustic panel to the side edges of adjacent acoustic panels. For example, pairs of magnets can be located along each mitered side edge of each acoustic panel so that the magnets attract each other and join the side edges of adjacent acoustic panels.

Figure 5:
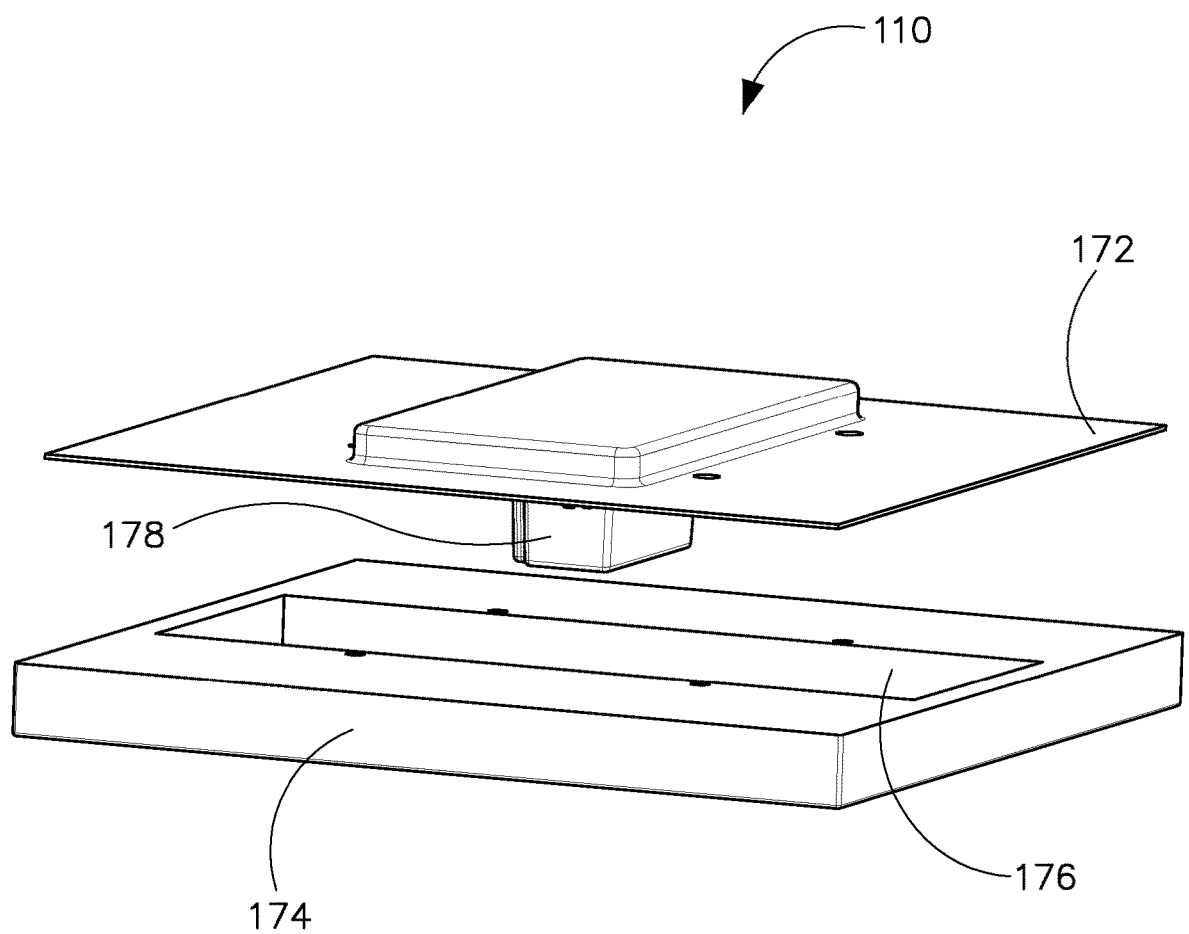
FIG. 5 is another exploded partial view of the suspended luminaire in accordance with an example embodiment of the disclosure.

Referring to FIG. 5, an exploded view of the optional intermediate panel 110 is shown. The example intermediate panel 110 shown in FIG. 5 comprises a base 174, a base cavity 176, and a cap 172. The example intermediate panel 110 further comprises a power supply 178 disposed within the base cavity 176. The power supply 178 can be electrically coupled to a power supply cable (not shown) for receiving class 1 power from a power source. The power supply 178 can further be coupled to one or more cables, such as cables 112 and 113, to deliver modified power to the one or more LEDs 160 of the light module 120.

As referenced above, the example suspended luminaire shown in FIGS. 1-5 and described herein provides several benefits. When powered on, the LEDs of the light module 120 can direct light into the lightguide 122 and illumination light can exit either or both of the top and bottom broad surfaces of the lightguide 122. When the LEDs are powered off, the lightguide is relatively transparent so that ambient light, such as light from a window, a skylight, or another source, can pass through the lightguide 122 and illuminate an area below the luminaire 100. The suspended luminaire 100 provides a further benefit in that the acoustic panels can absorb unwanted noise in the area where the luminaire is installed. In alternate embodiments, the acoustic panels can have other shapes or positions to modify the effectiveness of their sound absorption characteristics. Additionally, the acoustic panels operate as a shade surrounding the lightguide 122 and directing light emitted from the lightguide 122.

Referring now to FIGS. 6-14, additional example embodiments of luminaires with acoustic features are illustrated. Many of the components illustrated in FIGS. 6-14 are similar to analogous components of FIGS. 1-5 and their description will not be repeated.

Turning to FIGS. 6-13, a second example embodiment of a suspended luminaire 200 is illustrated. Luminaire 200 comprises a light module 220 suspended by suspension cables 206, 207, 208, and 209 from a mounting box 205. Mounting box 205 can be attached to a ceiling, a beam, or another support structure. An optional intermediate cable collector 210 is disposed between the mounting box 205 and the light module 220. The light module 220 comprises a frame 223 containing at least one LED 260. The frame holds a lightguide 222. As with the previous example, the lightguide 222 comprises a broad top side, a broad bottom side, and a narrow edge surface. The at least one LED 260 is mounted adjacent the narrow edge surface so that LED light is directed from the LED into the lightguide panel.

Figure 6:
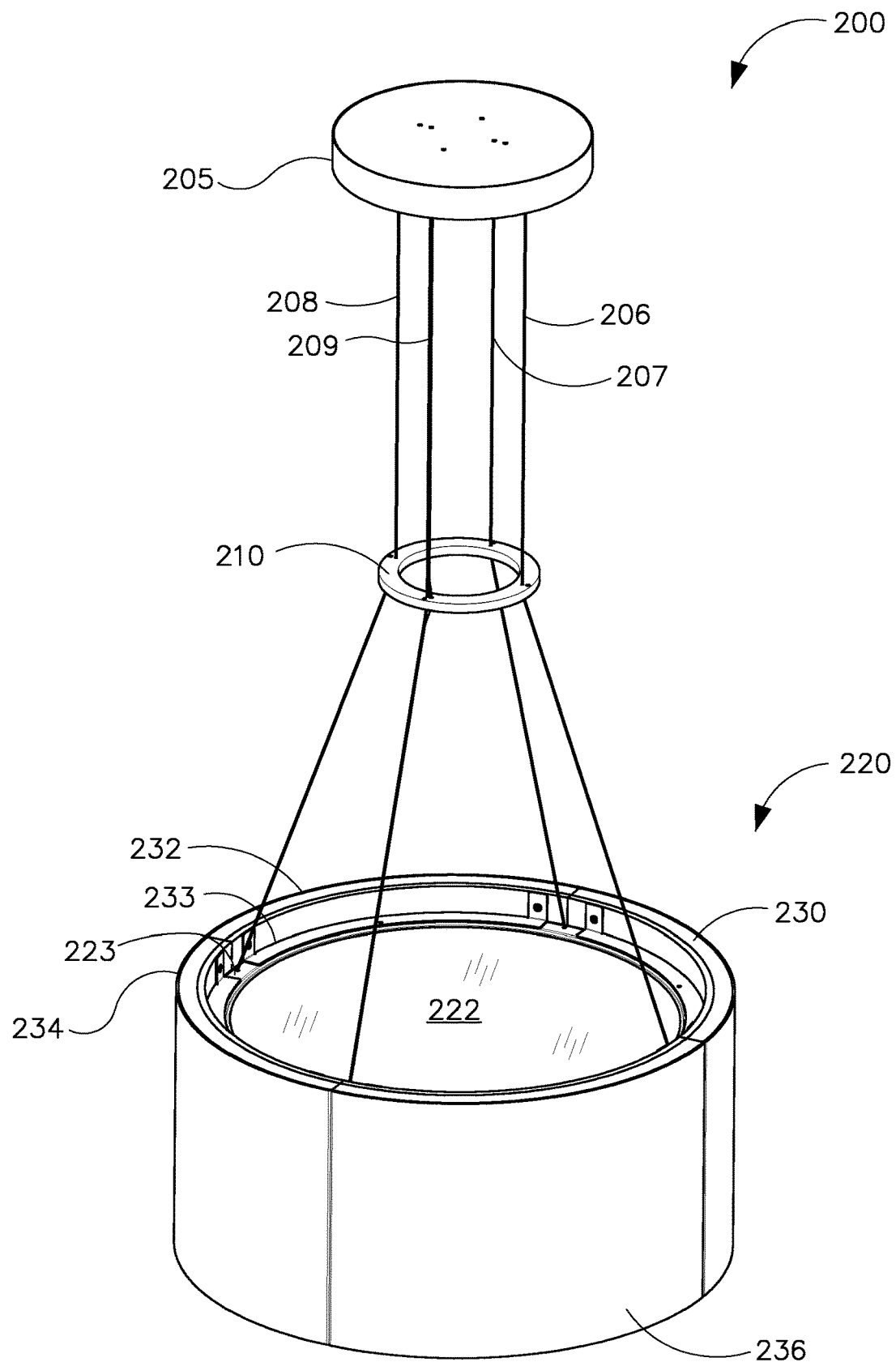
FIG. 6 is a top perspective view of a suspended luminaire in accordance with a second example embodiment of the disclosure.
Figure 7:
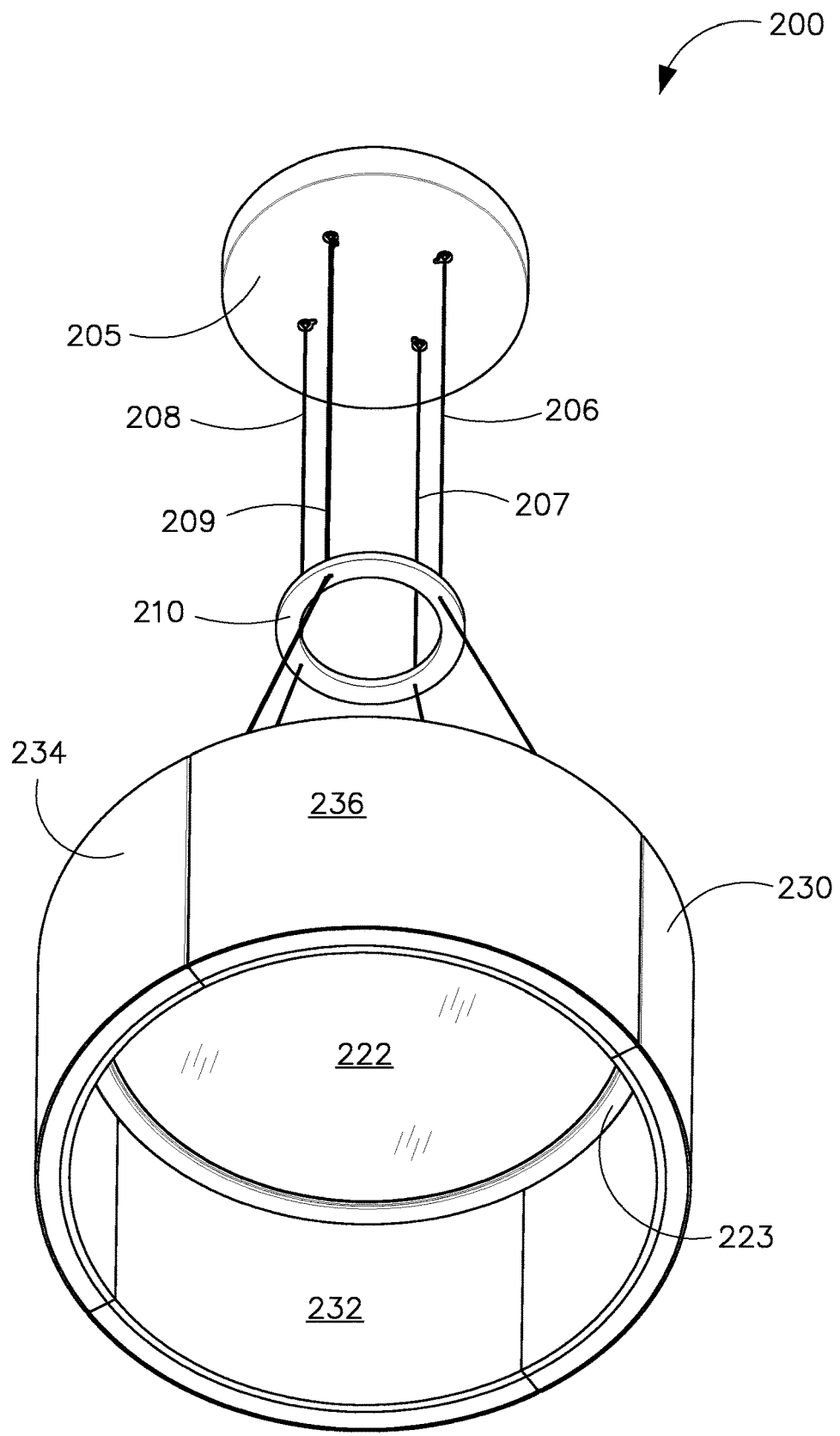
FIG. 7 is a bottom perspective view of a suspended luminaire in accordance with the second example embodiment of the disclosure.
Figure 8:
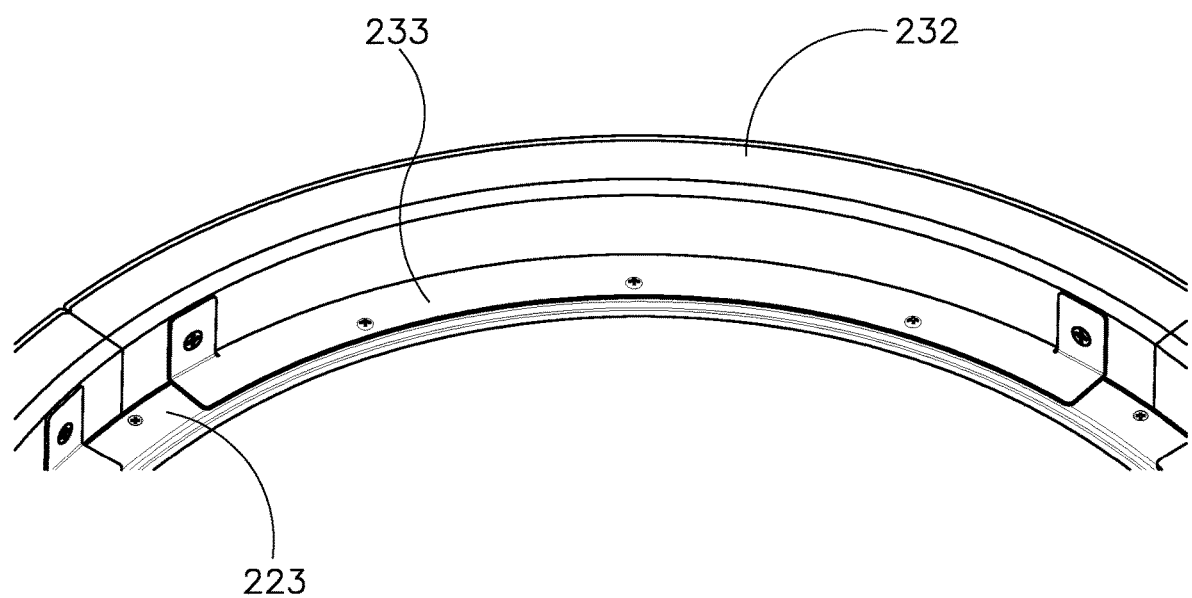
FIG. 8 illustrates a portion of an acoustic panel of the second example embodiment of the disclosure.

The light module 220 also comprises four acoustic panels 230, 232, 234, and 236. The four acoustic panels each have a curved shape so that when they are joined to the frame 223 as shown in FIGS. 6 and 7, the entire light module 220 has a cylindrical shape. In example luminaire 200, each acoustic panel is joined to the frame 223 with a bracket 233 as shown in FIG. 8. Bracket 233 comprises a lower member that fastens to a top panel 224 of the frame 223. Bracket 233 also comprises two flanges that extend vertically from the lower member and that fasten to an inner surface of the acoustic panel. Bracket 233 has a curved shape to match the curvature of the frame 223 and the acoustic panel. In alternate embodiments, the bracket can have other shapes or components or can be fastened to the acoustic panel and the frame in alternate configurations.

Figure 9:
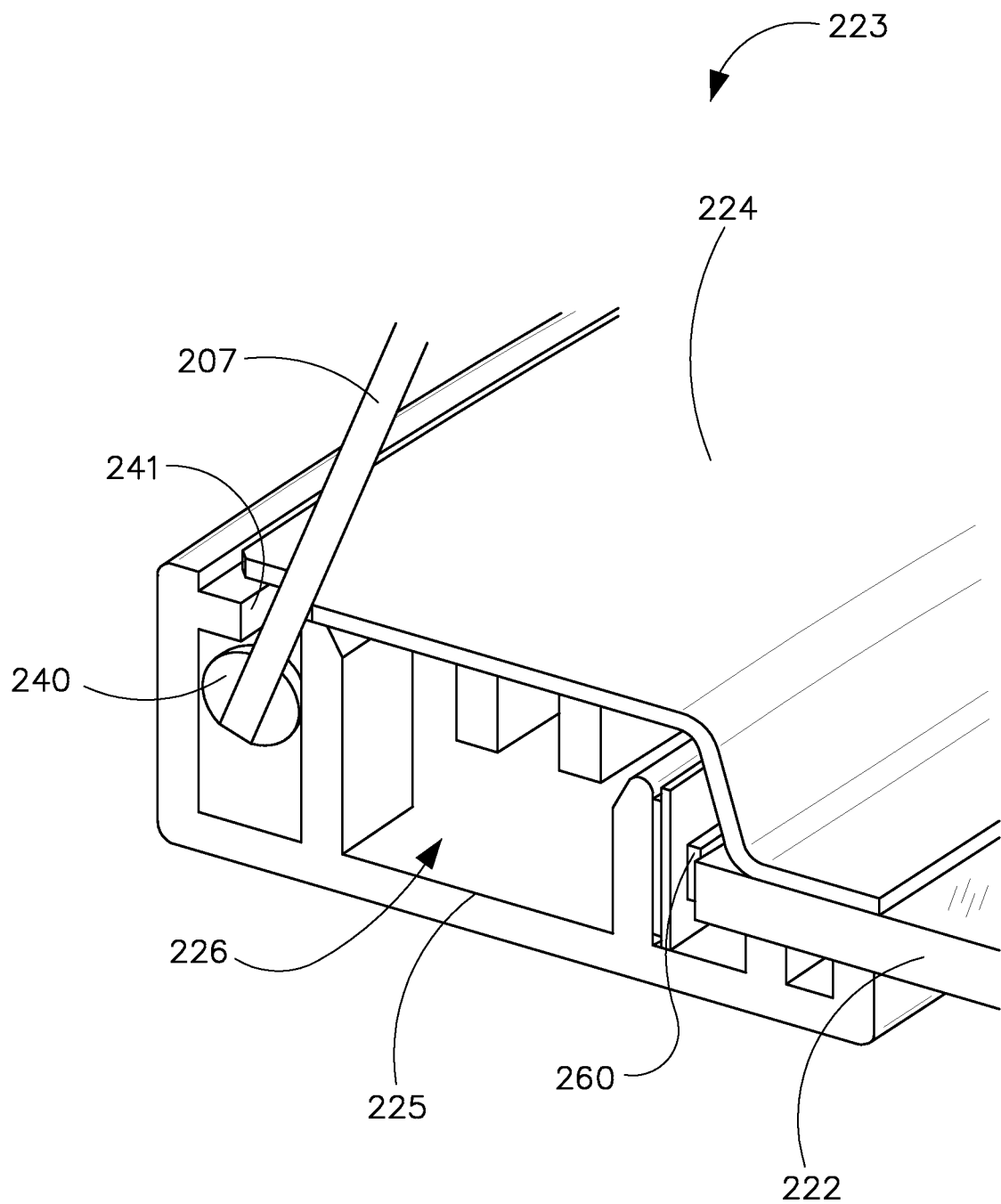
FIG. 9 illustrates a portion of a frame of the second example embodiment of the disclosure.
Figure 10:
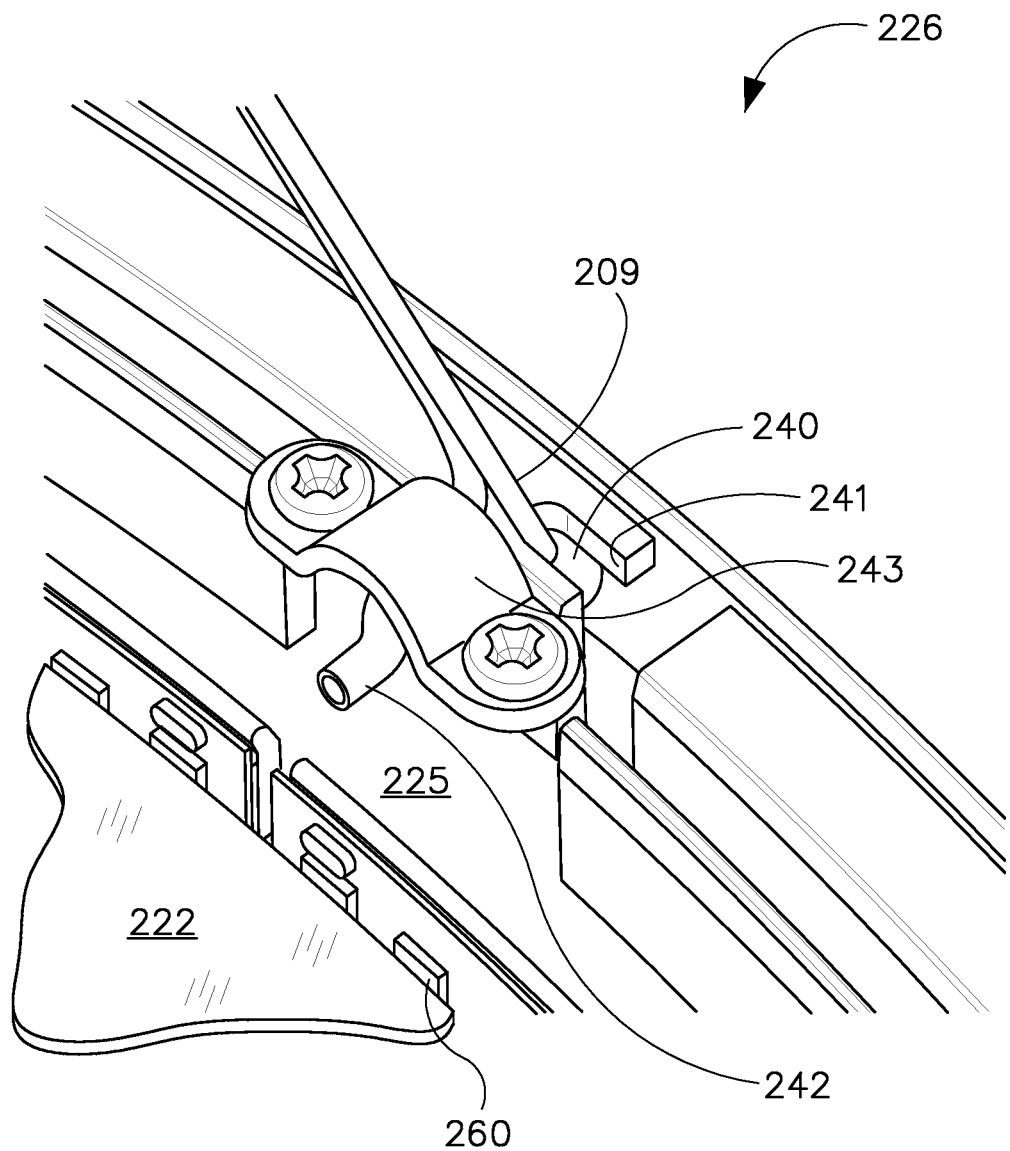
FIG. 10 illustrates another portion of the frame of the second example embodiment of the disclosure.

FIGS. 9 and 10 provide views of portions of the frame 223 in accordance with example luminaire 200. FIG. 9 provides a cross-sectional view of the frame 223 showing the top panel 224, a bottom panel 225 and the frame cavity 226 formed between the top panel and the bottom panel. In the example of FIGS. 9 and 10, the bottom panel 225 is formed from extruded aluminum and the top panel is formed from sheet metal. In alternate embodiments the frame can be comprised of other materials or components having other shapes. As illustrated in FIG. 9, the lightguide 222 is held in place between the inner edge of the top panel 224 and the inner edge of the bottom panel 225. The frame cavity 226 includes an inner wall on which the one or more LEDs 260 are mounted so that they are adjacent to the edge surface of the lightguide. Along the outer edge, the frame comprises a plurality of slots that receive the suspension cables. Each slot, such as slot 241, receives a suspension cable, such as suspension cable 207. The end of each suspension cable includes an anchor, such as anchor 240, that is larger than the slot and that secures the suspension cable to the frame.

FIG. 10 shows another portion of the frame 223 with the top panel 224 removed to more clearly illustrate the bottom panel 225 and the frame cavity 226. The portion of the frame 223 shown in FIG. 10 includes suspension cable 209 retained by anchor 240 in slot 241. The portion of the frame 223 shown in FIG. 10 shows low voltage wire 242 for delivering power to the LED 260. For simplicity, FIG. 10 shows a single low voltage wire 242, however, is should be understood that low voltage power is typically provided to the LEDs with a pair of low voltage wires. The pair of low voltage wires may be routed to the LEDs together within a low voltage cable. Alternatively, the pair of low voltage wires may be routed separately to the LEDs. Although not shown in FIG. 10, the appropriate connectors or terminations connect the low voltage wires to the LEDs 260. FIG. 10 also shows a strain relief bracket 243 securing the low voltage wire 242. Although the top panel has been removed in FIG. 10, the strain relief bracket 243 can be fastened to the top panel 224.

Figure 11:
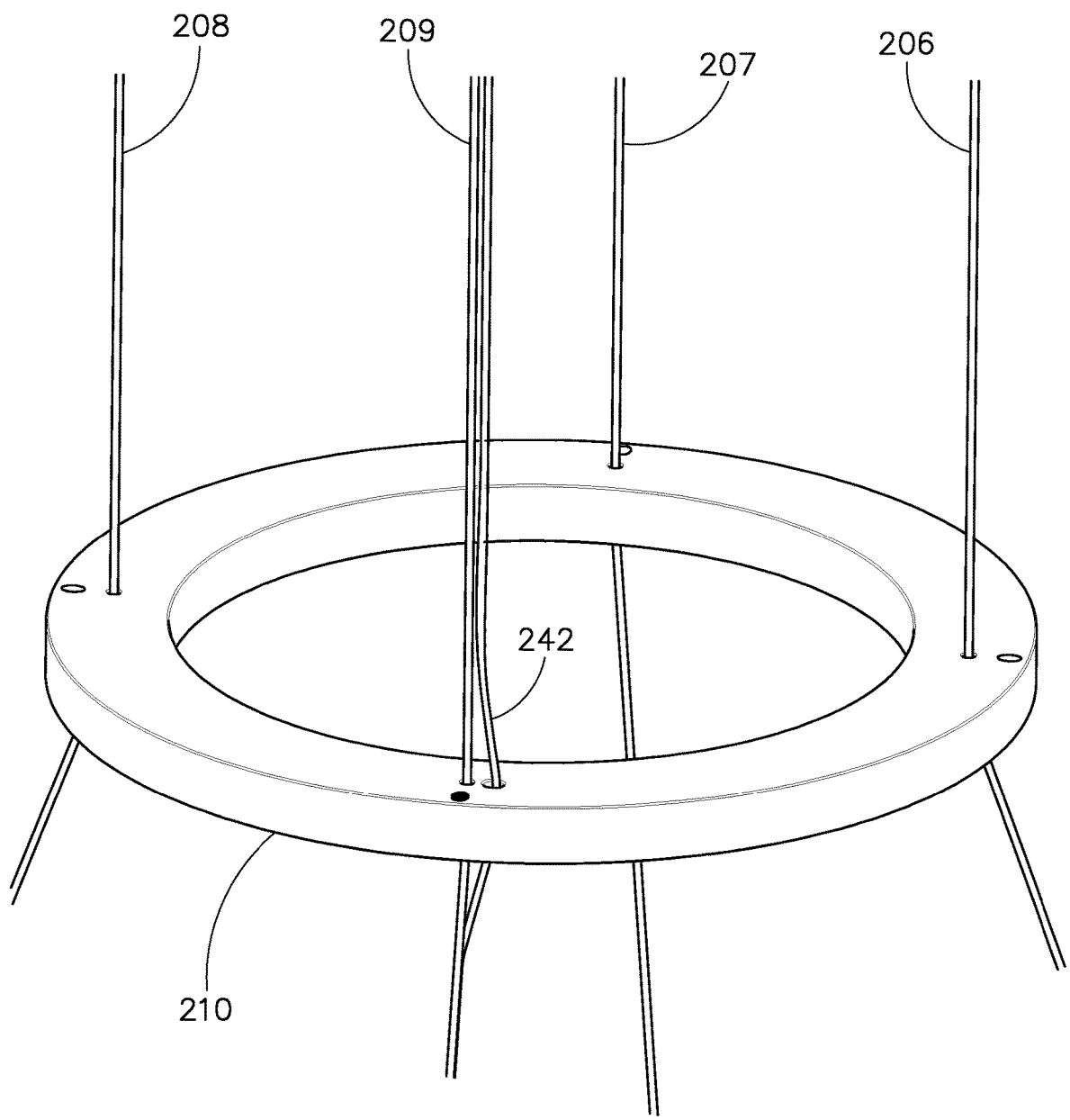
FIG. 11 illustrates an intermediate wire collector of the second example embodiment of the disclosure.
Figure 12:
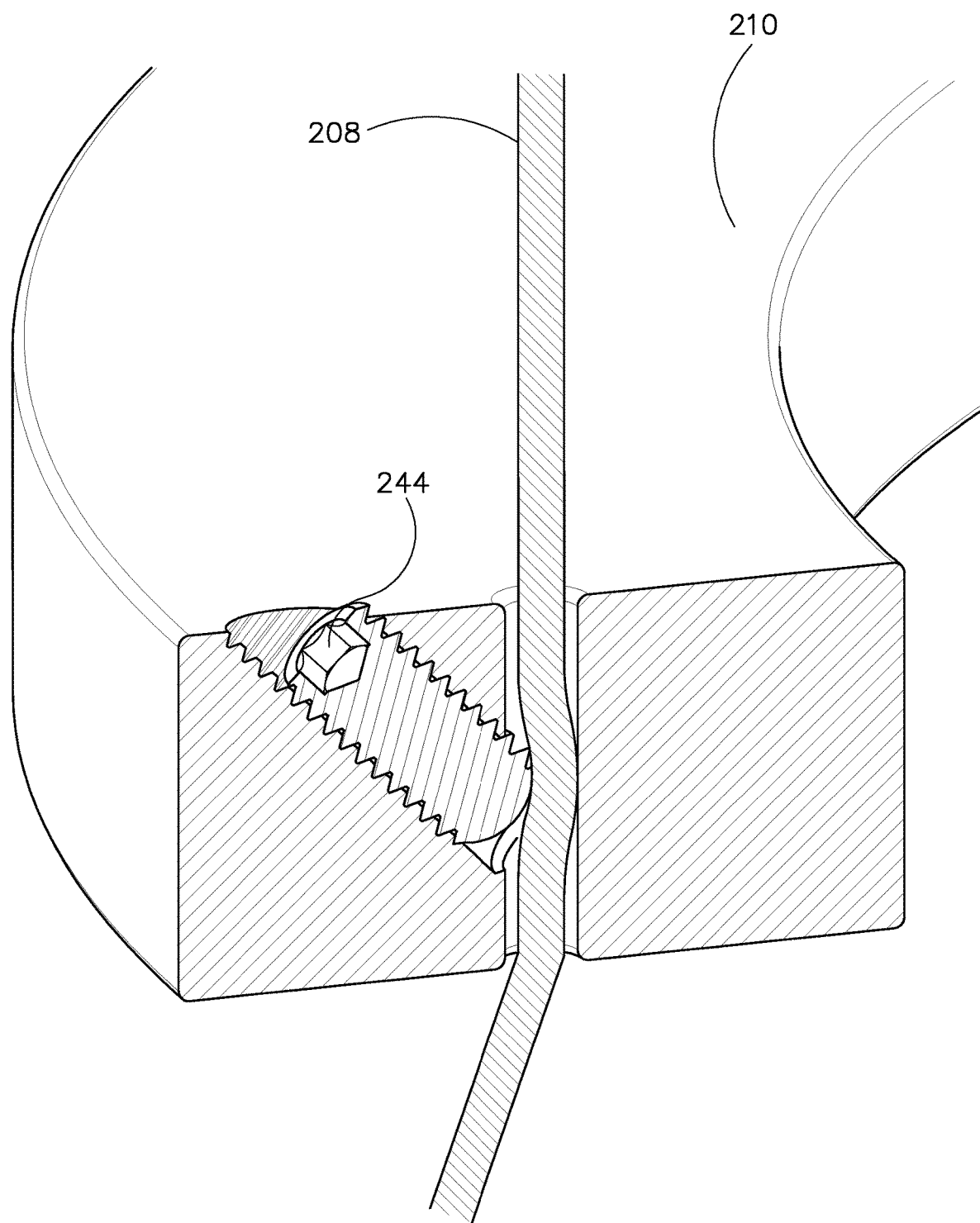
FIG. 12 illustrates a cross-sectional view of the intermediate wire collector of the second example embodiment of the disclosure.

FIGS. 11 and 12 illustrate aspects of the optional intermediate cable collector 210. FIG. 11 provides a perspective view of the intermediate cable collector and FIG. 12 provides a cross-sectional view of the intermediate cable collector. As shown in FIGS. 11 and 12, the suspension cables 206, 207, 208, and 209 pass through apertures in the intermediate cable collector 210 so that the suspension cables run continuously from the mounting box 205 to the light module 220. The intermediate cable collector 201 also includes one or more apertures permitting one or more low voltage cables, such as low voltage cable 242, to pass through the intermediate cable collector 201. As shown in FIG. 12, the intermediate cable collector 201 can include set screws, such as set screw 244, adjacent to each aperture. The set screws can be tightened to secure the suspension cables and the low voltage cables to the intermediate cable collector 201.

Figure 13:
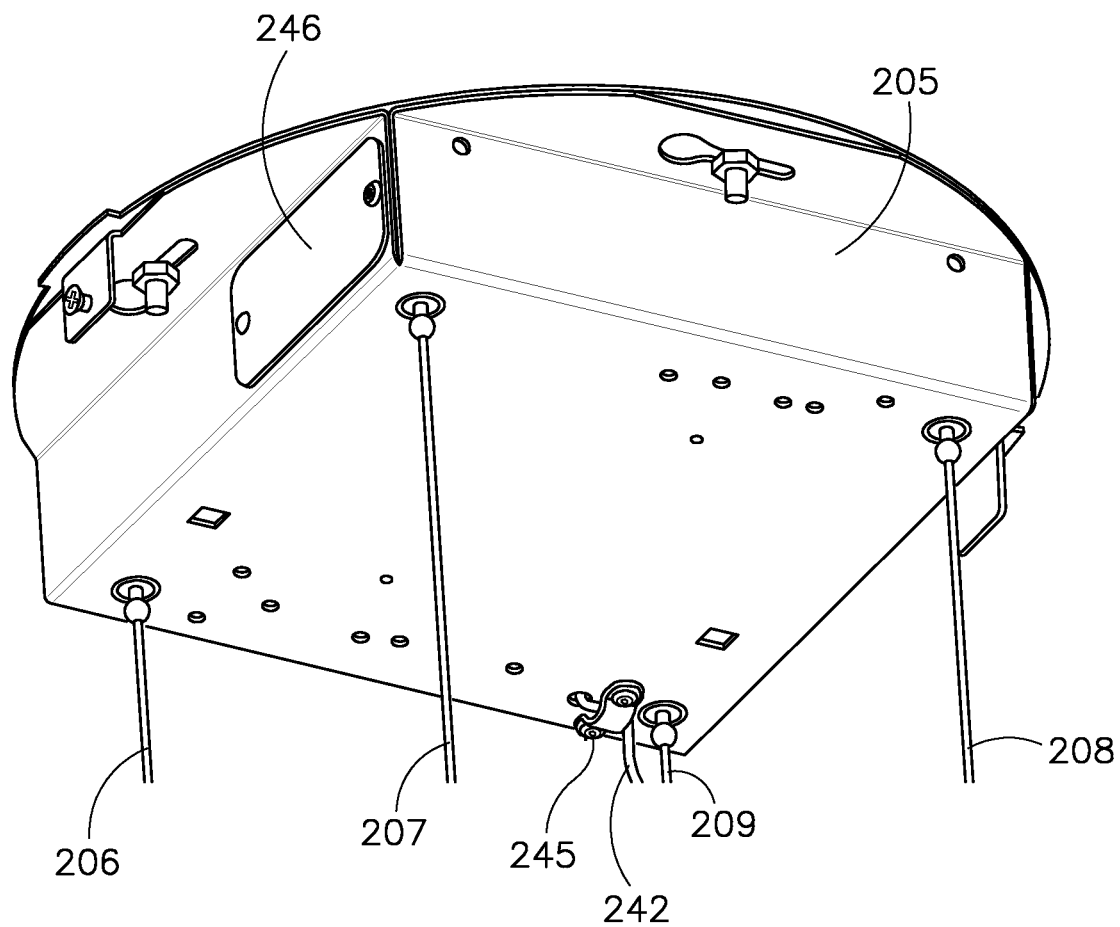
FIG. 13 illustrates a mounting box of the second example embodiment of the disclosure.

Referring now to FIG. 13, an enlarged view of the mounting box 205 is illustrated. In the example illustrated in FIG. 13, the outer decorative cover shown in FIGS. 6 and 7 has been removed to more clearly show the mounting box. The mounting box 205 includes apertures for receiving the suspension cables. Similar to the arrangement with the frame 223, the ends of the suspension cables can include anchors that are secured within the mounting box 205. The mounting box 205 also includes one or more apertures through which low voltage wires can pass to be connected to a power supply within the mounting box 205. The power supply within the mounting box 205 can connect to a power source, such as a class 1 power source, and can convert the class 1 power to a low voltage power for supplying via the low voltage cable to the LEDs 160. The example low voltage wire 242 can be secured to the mounting box 205 with a strain relief bracket 245. The mounting box can also include one or more splice inspection doors, such as door 246, that can slide open to permit a visual inspection of the wiring connections within the mounting box 205. Lastly, the example mounting box 205 shown in FIG. 13 includes a mounting plate for securing the mounting box to a mounting surface such as a ceiling or a beam. It should be understood that in alternate embodiments, certain of the features shown in FIG. 13 may be omitted or replaced with alternate features.

Figure 14:
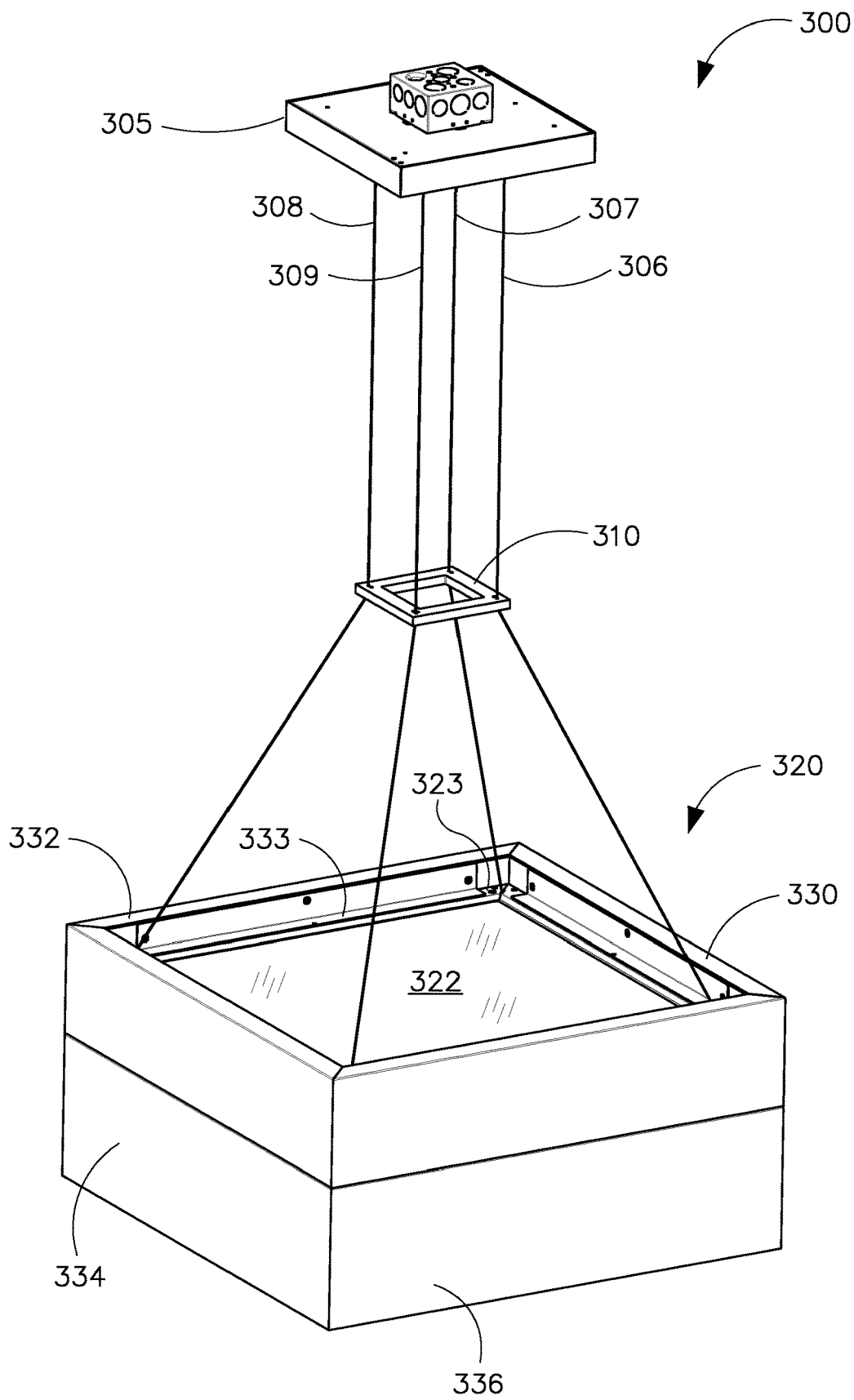
FIG. 14 is a top perspective view of a suspended luminaire in accordance with a third example embodiment of the disclosure.

Referring now to FIG. 14, a third example embodiment of a luminaire 300 having acoustic features is illustrated. Many of the features of luminaire 300 are similar to features of luminaire 200 and a detailed description of these features will not be repeated. Example luminaire 300 includes a light module 320 suspended from a mounting box 305 by suspension cables 306, 307, 308, and 309. The mounting box 305 includes a power supply that supplies low voltage power via low voltage wires to the light module 320. An optional intermediate cable collector 310 can be positioned between the mounting box 305 and the light module 320.

The light module 320 comprises a lightguide 322 secured by a frame 323 and the frame comprises one more LEDs which direct light into a narrow edge surface of the lightguide 322. The light module 320 also comprises four acoustic panels 330, 332, 334, and 336 attached to the frame 323. Brackets, such as bracket 333 that is similar to bracket 233 of FIG. 8, can attach each acoustic panel to the frame 323.

Figure 15:
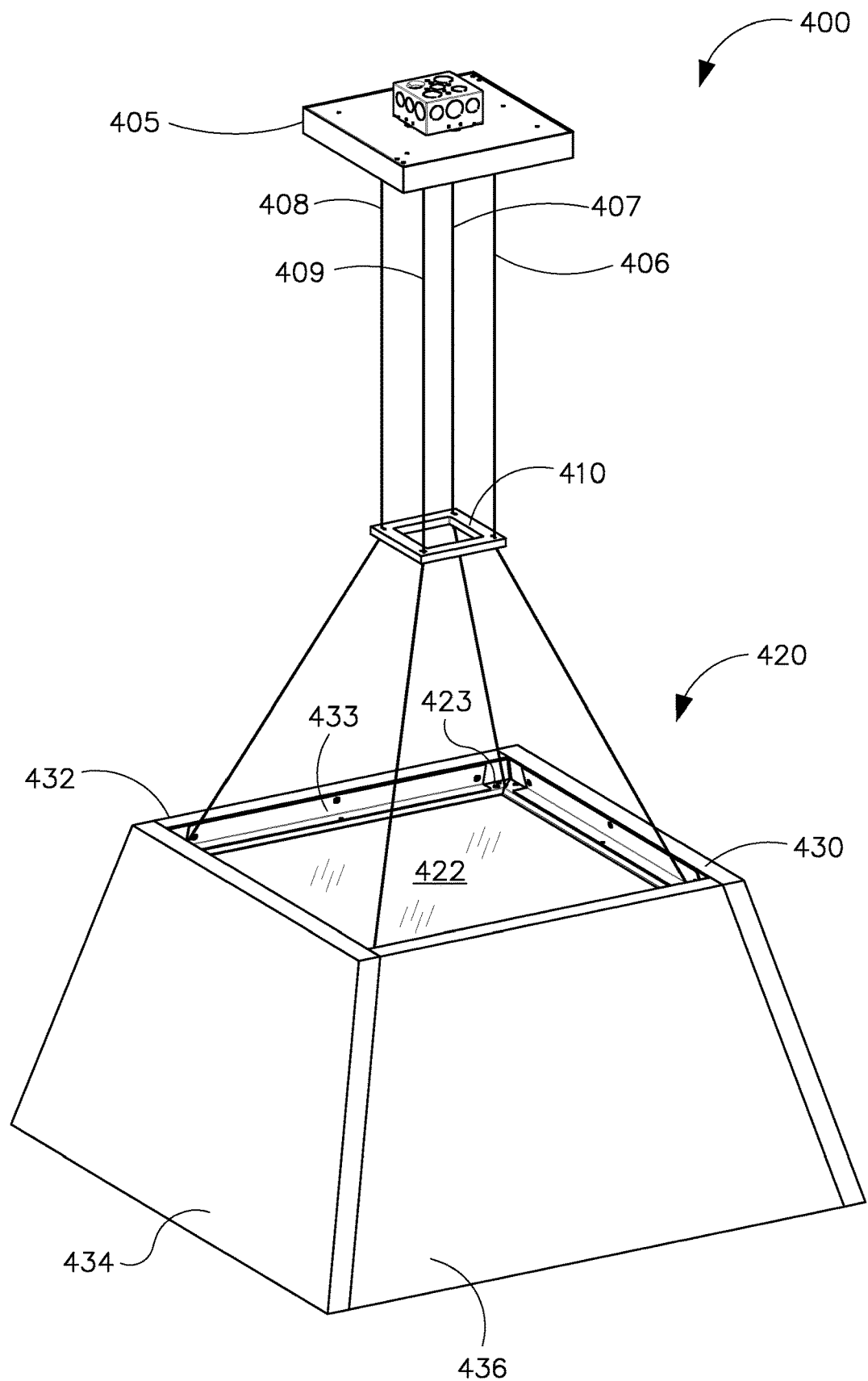
FIG. 15 is a top perspective view of a suspended luminaire in accordance with a fourth example embodiment of the disclosure.

Referring now to FIG. 15, a fourth example embodiment of a luminaire 400 having acoustic features is illustrated. Many of the features of luminaire 400 are similar to features of luminaire 200 and a detailed description of these features will not be repeated. Example luminaire 400 includes a light module 420 suspended from a mounting box 405 by suspension cables 406, 407, 408, and 409. The mounting box 405 includes a power supply that supplies low voltage power via low voltage wires to the light module 420. An optional intermediate cable collector 410 can be positioned between the mounting box 405 and the light module 420.

The light module 420 comprises a lightguide 422 secured by a frame 423 and the frame comprises one more LEDs which direct light into a narrow edge surface of the lightguide 422. The light module 420 also comprises four acoustic panels 430, 432, 434, and 436 attached to the frame 423. Brackets, such as bracket 433 that is similar to bracket 233 of FIG. 8, can attach each acoustic panel to the frame 423. One way in which example luminaire 400 differs from the previous luminaires is that the acoustic panels 430, 432, 434, and 436 are arranged at angle other than 90 degrees with respect to the lightguide 422 so that they form the shape of a truncated pyramid. In other words, the angle between each acoustic panel and the bottom surface of the lightguide is greater than 90 degrees so that the bottom of the light module 420 had a larger area than the top of the light module 420.

Figure 16:
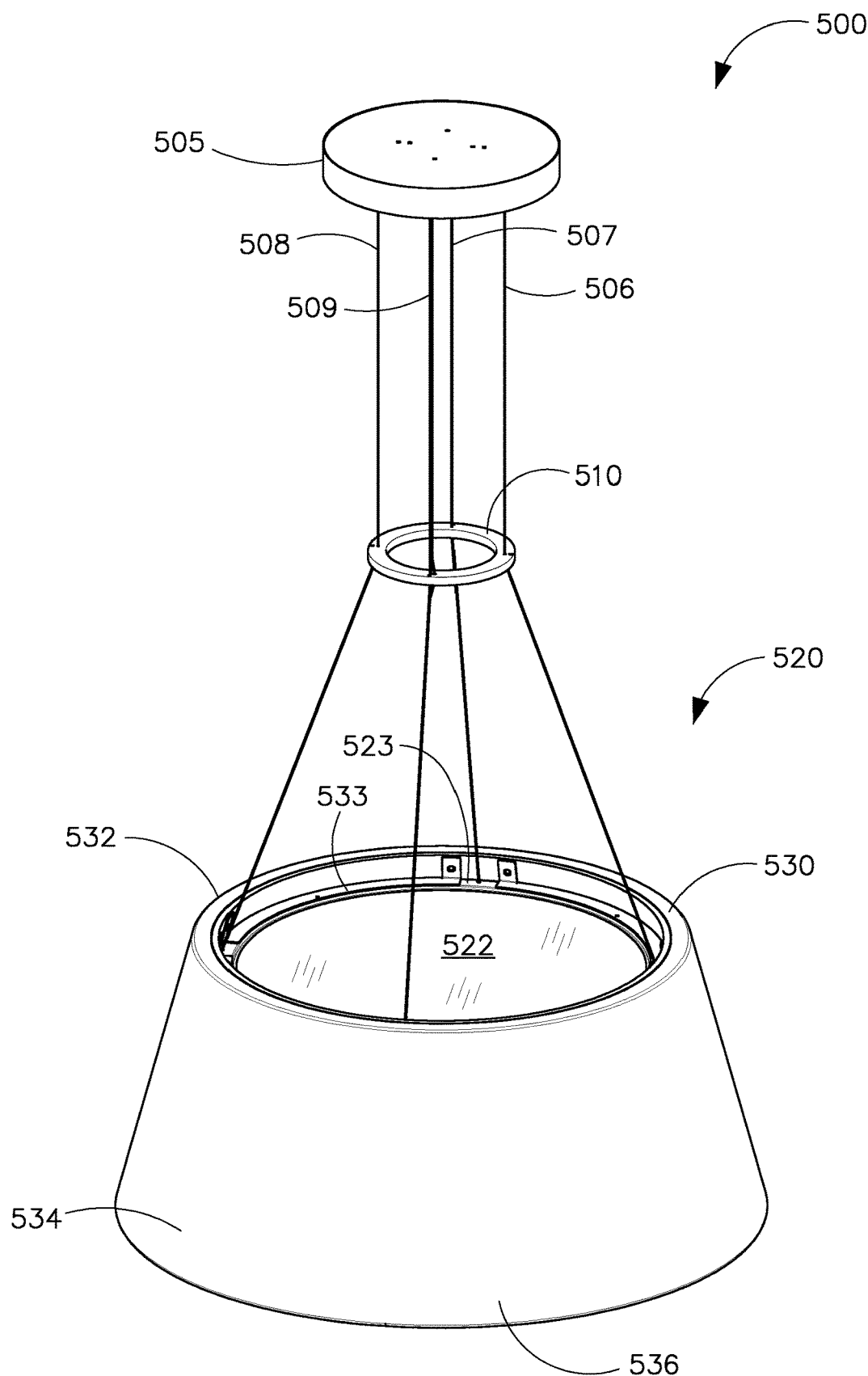
FIG. 16 is a top perspective view of a suspended luminaire in accordance with a fifth example embodiment of the disclosure.

Referring now to FIG. 16, a fifth example embodiment of a luminaire 500 having acoustic features is illustrated. Many of the features of luminaire 500 are similar to features of luminaire 200 and a detailed description of these features will not be repeated. Example luminaire 500 includes a light module 520 suspended from a mounting box 505 by suspension cables 506, 507, 508, and 509. The mounting box 505 includes a power supply that supplies low voltage power via low voltage wires to the light module 520. An optional intermediate cable collector 510 can be positioned between the mounting box 505 and the light module 520.

The light module 520 comprises a lightguide 522 secured by a frame 523 and the frame comprises one more LEDs which direct light into a narrow edge surface of the lightguide 522. The light module 520 also comprises four acoustic panels 530, 532, 534, and 536 attached to the frame 523. Brackets, such as bracket 533 that is similar to bracket 233 of FIG. 8, can attach each acoustic panel to the frame 523. One way in which example luminaire 500 differs from the previous luminaires is that the acoustic panels form the shape of a truncated cone with the bottom of the light module 520 being wider than the top of the light module 520.

Representative embodiments have been described herein with reference to the accompanying drawings that illustrate embodiments of the technology. The technology may, however, be embodied in many different forms and should not be construed as limited to the embodiments set forth herein; rather, these embodiments are provided so that this disclosure will be thorough and complete, and will fully convey the scope of the technology to those appropriately skilled in the art.

Any example luminaires, or components thereof, described herein can be made from a single piece (e.g., as from a mold, injection mold, die cast, 3-D printing process, extrusion process, stamping process, or other prototype methods). In addition, or in the alternative, an example luminaire (or components thereof) can be made from multiple pieces that are mechanically coupled to each other. In such a case, the multiple pieces can be mechanically coupled to each other using one or more of a number of coupling methods, including but not limited to epoxy, welding, soldering, etching, fastening devices, compression fittings, mating threads, tabs, and slotted fittings. One or more pieces that are mechanically coupled to each other can be coupled to each other in one or more of a number of ways, including but not limited to fixedly, hingedly, removeably, slidably, and threadably.

Components and/or features described herein can include elements that are described as coupling, fastening, securing, abutting, or other similar terms. Such terms are merely meant to distinguish various elements and/or features within a component or device and are not meant to limit the capability or function of that particular element and/or feature. For example, a feature described as a "coupling feature" can couple, secure, fasten, abut, and/or perform other functions aside from merely coupling.

A coupling feature (including a complementary coupling feature) as described herein can allow one or more components and/or portions of an example luminaire to become coupled, directly or indirectly, to another portion of the example luminaire and/or some external component (e.g., a wall, a ceiling). A coupling feature can include, but is not limited to, a snap, a clamp, a portion of a hinge, an aperture, a recessed area, a protrusion, a slot, a spring clip, a tab, a detent, and mating threads. One portion of an example luminaire can be coupled to another component of the example luminaire or an external component by the direct use of one or more coupling features.

In addition, or in the alternative, a portion of an example luminaire can be coupled to another portion of the luminaire or another component using one or more independent devices that interact with one or more coupling features disposed on the example luminaire. Examples of such devices can include, but are not limited to, a pin, a hinge, a fastening device (e.g., a bolt, a screw, a rivet), epoxy, a sealing member (e.g., an O-ring, a gasket), glue, adhesive, tape, and a spring. One coupling feature described herein can be the same as, or different than, one or more other coupling features described herein. A complementary coupling feature (also sometimes called a corresponding coupling feature) as described herein can be a coupling feature that mechanically couples, directly or indirectly, with another coupling feature.

If a component of a figure is described but not expressly shown or labeled in that figure, the label used for a corresponding component in another figure can be inferred to that component. Conversely, if a component in a figure is labeled but not described, the description for such component can be substantially the same as the description for the corresponding component in another figure. The numbering scheme for the various components in the figures herein is such that each component is a three-digit number, and corresponding components in other figures have the identical last two digits. For any figure shown and described herein, one or more of the components may be omitted, added, repeated, and/or substituted. Accordingly, embodiments shown in a particular figure should not be considered limited to the specific arrangements of components shown in such figure.

Further, a statement that a particular embodiment (e.g., as shown in a figure herein) does not have a particular feature or component does not mean, unless expressly stated, that such embodiment is not capable of having such feature or component. For example, for purposes of present or future claims herein, a feature or component that is described as not being included in an example embodiment shown in one or more particular drawings is capable of being included in one or more claims that correspond to such one or more particular drawings herein.

Many modifications and other embodiments of the disclosures set forth herein will come to mind to one skilled in the art to which these disclosures pertain having the benefit of the teachings presented in the foregoing descriptions and the associated drawings. Therefore, it is to be understood that the disclosures are not to be limited to the specific embodiments disclosed and that modifications and other embodiments are intended to be included within the scope of this application. Although specific terms are employed herein, they are used in a generic and descriptive sense only and not for purposes of limitation.

What is claimed is:

1. A luminaire comprising:
   a frame comprising a top panel, a bottom panel, an outer side wall, an inner side wall, a frame cavity, and at least one light emitting diode (LED) mounted to the inner side wall;
   a lightguide disposed within the frame and between the top panel and the bottom panel, the lightguide comprising a top surface, a bottom surface, and an edge surface, the edge surface configured to receive LED light from the at least one LED;
   a power cable attached to the frame, the power cable configured to deliver power to the at least one LED;
   a plurality of suspension cables attached to the frame at first ends of the plurality of suspension cables, each first end of the first ends coupled to the frame;
   at least one bracket, the at least one bracket comprising a lower member and a flange, the lower member coupled to the top panel of the frame; and
   at least one acoustic panel, the at least one acoustic panel comprising a top panel surface, a bottom panel surface, an inner panel surface, and an outer panel surface, the flange of the at least one bracket coupled to the inner panel surface below the top panel surface and above the bottom panel surface,
   wherein the luminaire comprises an upper open cavity formed by the inner panel surface and the top surface of the lightguide, and the luminaire comprises a lower open cavity formed by the inner panel surface and the lower surface of the lightguide.

2. The luminaire of claim 1, wherein the frame has a frame shape that is one of a circle or a polygon.

3. The luminaire of claim 1, wherein the lightguide has a lightguide shape that is one of a circle or a polygon.

4. The luminaire of claim 1, further comprising a mounting box, wherein the plurality of suspension cables attach to the mounting box at second ends of the plurality of suspension cables.

5. The luminaire of claim 4, wherein the mounting box comprises a power supply for providing power to the at least one LED via the power cable.

6. The luminaire of claim 4, further comprising an intermediate cable collector, wherein the plurality of suspension cables pass through the intermediate cable collector and are secured to the intermediate cable collector.

7. The luminaire of claim 1, wherein the at least one acoustic panel comprises one or more of cork, felt, foam, and polyethylene terephthalate.

8. The luminaire of claim 1, wherein the inner panel surface of the at least one acoustic panel and the outer panel surface of the at least one acoustic panel comprise protrusions extending from the inner panel surface and the outer panel surface that increase sound absorption.

9. The luminaire of claim 1, wherein the at least one acoustic panel comprises a recess for coupling the at least one acoustic panel to the outer side wall of the frame.

10. The luminaire of claim 1, wherein the at least one acoustic panel comprises four acoustic panels attached around the frame.

11. The luminaire of claim 10, wherein the four acoustic panels comprise mitered side edges with magnets, the magnets for adjoining each acoustic panel to an adjacent acoustic panel of the four acoustic panels.

12. The luminaire of claim 1, wherein the lightguide emits the LED light from the at least one LED when the at least one LED is powered on and wherein the lightguide transmits ambient light therethrough when the at least one LED is powered off.

13. A luminaire comprising:
a frame comprising a top panel, a bottom panel, an outer side wall, an inner side wall, a frame cavity, and at least one light emitting diode (LED) mounted to the inner side wall;
a lightguide disposed within the frame and between the top panel and the bottom panel, the lightguide comprising a top surface, a bottom surface, and an edge surface, the edge surface configured to receive LED light from the at least one LED;
a plurality of suspension cables attached to the frame at first ends of the plurality of suspension cables, each first end of the first ends coupled to the frame, the plurality of suspension cables comprising a power cable configured to deliver power to the at least one LED;
at least one bracket, the at least one bracket comprising a lower member and a flange, the lower member coupled to the top panel of the frame; and
at least one acoustic panel, the at least one acoustic panel comprising a top panel surface, a bottom panel surface, an inner panel surface, and an outer panel surface, the flange of the at least one bracket coupled to the inner panel surface below the top panel surface and above the bottom panel surface,
wherein the luminaire comprises an upper open cavity formed by the inner panel surface and the top surface of the lightguide, and the luminaire comprises a lower open cavity formed by the inner panel surface and the lower surface of the lightguide.

14. The luminaire of claim 13, further comprising a plate coupled to the power cable, the plate comprising a driver for providing power to the at least one LED via the power cable.

15. The luminaire of claim 14, further comprising at least one upper suspension cable coupled to a top surface of the plate at a distal end of the suspension cable.

16. The luminaire of claim 14, further comprising a power source cable attached to the driver at a distal end of the power source cable, a proximal end of the power source cable configured for attaching to a power source.

17. The luminaire of claim 13, wherein the at least one acoustic panel comprises one or more of cork, felt, foam, and polyethylene terephthalate.

* * * * *